May 26, 1942.  T. M. WELLING  2,284,029

WEDDING BOUQUET HOLDER

Filed Sept. 20, 1940

Inventor

Thomas M. Welling

Patented May 26, 1942

2,284,029

UNITED STATES PATENT OFFICE 2,284,029

WEDDING BOUQUET HOLDER

Thomas M. Welling, Cleveland, Ohio

Application September 20, 1940, Serial No. 357,641

2 Claims. (Cl. 24—6)

This invention relates to a new wedding bouquet holder that I developed to be used as an aid in carrying flowers, with my holder attached to bouquet the wearer can place same over wrist enabling the wearer to have both hands free, it also can be held in the palm of the hand which is more comfortable to wear than holding by the natural stems. The holder eliminates unnecessary bruising, crushing, and disarranging of flowers because the holder is responsible for the flowers being in front of the body. This holder also tends to give a better picture of the flower arrangement.

Fig. 1 shows bouquet as it looks when held as shown in Fig. 2 by holder.

Fig. 3 is a back view of holder showing perforated clamps at top and bottom of shaft or holder.

Fig. 4 is a side view of holder.

Fig. 5 shows a horizontal cross-section of the holder through line 5—5 of Figure 2.

Fig. 6 shows pointed pin support inserted in stems of flowers which prevent slipping, turning and etc.

Fig. 7 is a cross-section view of the holder through line 7—7 of Fig. 3, showing extruded perforations presenting a gripping surface in clamping means.

The holder can be attached to the back of the bouquet during the latter part of the bouquet construction by inserting pointed supports into bottom part of stems. Bend perforated clamp around stems both at top and bottom. The bottom clamp is not really necessary because during the course of the making of the bouquet string or wire is usually used and to make holder more secure the string or wire could be wound around bottom of holder at same time. This simple method could be applied if the bottom clamp is not used. The bottom clamp was added more as a support to the pin in the event string or wire are not used.

Having thus described my invention what I claim as new and desire to secure by United States Letters Patent is:

1. A bouquet holder of pliable material, comprising a substantially straight shank portion, clamping means extending from said shank for embracing the stems of the bouquet, and one end portion of the shank extending reversely in the form of a hook.

2. A bouquet holder of pliable material comprising a substantially straight shank portion, clamping means extending from said shank for embracing the stems of the bouquet, one end portion of the shank extending reversely in the form of a hook and the other end of the shank extending oppositely, at right angles thereto in the form of a point, to penetrate the stems of the bouquet, and hold the same against slipping.

THOMAS M. WELLING.